United States Patent
Black et al.

(10) Patent No.: US 10,416,750 B2
(45) Date of Patent: Sep. 17, 2019

(54) ALGORITHM ENGINE FOR ULTRA LOW-POWER PROCESSING OF SENSOR DATA

(71) Applicant: QUALCOMM Incorporated, San Diego, CA (US)

(72) Inventors: Justin Black, Santa Clara, CA (US); Rashmi Kulkarni, San Carlos, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

(21) Appl. No.: 14/498,510

(22) Filed: Sep. 26, 2014

(65) Prior Publication Data

US 2016/0091955 A1    Mar. 31, 2016

(51) Int. Cl.
G06F 1/3234    (2019.01)
G01D 9/00    (2006.01)
G06F 1/3293    (2019.01)

(52) U.S. Cl.
CPC ........... *G06F 1/3243* (2013.01); *G01D 9/005* (2013.01); *G06F 1/3293* (2013.01); *Y02D 10/122* (2018.01); *Y02D 50/20* (2018.01)

(58) Field of Classification Search
None
See application file for complete search history.

(56) References Cited

U.S. PATENT DOCUMENTS

| | | | |
|---|---|---|---|
| 6,912,473 B2 | 6/2005 | Wendel et al. | |
| 6,912,706 B1 | 6/2005 | Stamm et al. | |
| 7,941,682 B2 | 5/2011 | Adams | |
| 7,996,811 B2 | 8/2011 | Hoberman et al. | |
| 9,665,155 B2 * | 5/2017 | Sengupta | G06F 1/3206 |
| 2003/0060185 A1 | 3/2003 | Fisher et al. | |
| 2005/0283743 A1 | 12/2005 | Mulholland et al. | |
| 2007/0079161 A1 | 4/2007 | Gupta | |
| 2009/0077404 A1 | 3/2009 | Herring et al. | |
| 2009/0259864 A1 | 10/2009 | Li et al. | |
| 2009/0303204 A1 | 12/2009 | Nasiri et al. | |
| 2011/0179297 A1 | 7/2011 | Simmons et al. | |
| 2012/0254878 A1 * | 10/2012 | Nachman | G06F 9/5094 718/102 |
| 2013/0057394 A1 * | 3/2013 | Andiappan | H04M 1/72569 340/10.51 |

(Continued)

OTHER PUBLICATIONS

Lavin C.M., et al., "Using Hard Macros to Reduce FPGA Compilation Time", International Conference on Field Programmable Logic and Applications, pp. 438-441, XP031854546, Aug. 2010.

(Continued)

*Primary Examiner* — Manuel L Barbee
*Assistant Examiner* — Raymond L Nimox
(74) *Attorney, Agent, or Firm* — Kilpatrick Townsend & Stockton/Qualcomm

(57) ABSTRACT

Disclosed is a method and apparatus for power-efficiently processing sensor data. In one embodiment, the operations implemented include: configuring a sensor fusion engine and a peripheral controller with a general purpose processor; placing the general purpose processor into a low-power sleep mode; reading data from a sensor and storing the data into a companion memory with the peripheral controller; processing the data in the companion memory with the sensor fusion engine; and awaking the general purpose processor from the low-power sleep mode.

20 Claims, 3 Drawing Sheets

(56) References Cited

U.S. PATENT DOCUMENTS

| | | | | |
|---|---|---|---|---|
| 2013/0103212 | A1* | 4/2013 | Andiappan | H04W 52/0225 700/286 |
| 2013/0117769 | A1 | 5/2013 | Sharma et al. | |
| 2013/0238921 | A1 | 9/2013 | Alpert et al. | |
| 2014/0229644 | A1* | 8/2014 | Thanigasalam | G06F 13/24 710/110 |
| 2014/0327630 | A1* | 11/2014 | Burr | G06F 3/0488 345/173 |
| 2014/0351560 | A1* | 11/2014 | Lautner | G06F 3/0346 712/30 |
| 2015/0186311 | A1* | 7/2015 | Yap | G06F 13/32 710/308 |
| 2015/0346799 | A1* | 12/2015 | Sengupta | G06F 1/3206 713/320 |
| 2015/0346806 | A1* | 12/2015 | Dalal | G06F 1/3287 713/2 |
| 2016/0285757 | A1* | 9/2016 | Srivastava | H04L 12/10 |
| 2017/0102787 | A1* | 4/2017 | Gu | G06F 3/0346 |
| 2017/0103036 | A1* | 4/2017 | Iyer | G06F 1/3287 |

OTHER PUBLICATIONS

International Search Report and Written Opinion—PCT/US2015/051026—ISA/EPO—dated Nov. 9, 2015.

Malathi P., et al., "FPGA Implementation of Data Fusion Algorithm for Distance Measurement", International Journal of Electronics Communication and Computer Engineering Volume, Apr. 6, 2014 (Apr. 6, 2014). pp. 2249-2271, XP055224767, Retrieved from the Internet: URL: http://ijecce.org/Download/conference/Tech_Pune_2014/15.pdf [retrieved on Oct. 30, 2015] the whole document.

Rodriguez-Donate C., et al., "FPGA-Based Fused Smart Sensor for Dynamic and Vibration Parameter Extraction in Industrial Robot Links", Sensors, vol. 10, No. 4, Apr. 26, 2010 (Apr. 26, 2010), pp. 4114-4129, XP055224761, DOI: 10.3390/s100404114 abstract; figures 3, 4, 6, 7 p. 4116, line 1-line 10 p. 4118, line 14—p. 4122, line 6 p. 4127. line 1-line 15.

Hayashi, Y. et al., "Verification of System LSIs for Image Processing", Fujitsu Sci. Tech.J., vol. 49, No. 1, pp. 124-130, Jan. 2013.

Fronte, Daniele, "Design and development of a recongurable cryptographic co-processor", Retrieved from the Internet: URL: https://tel.archives-ouvertes.fr/tel-00364723; 136 Pages, Feb. 26, 2009.

Hard Macro Definition from PC Magazine Encyclopedia as of May 10, 2013, 2 Pages, Retrieved from the Internet: URL: https://web.archive.org/web/20130510012906/https://www.pcmag.com/, accessed online on May 29, 2019.

TGC100 Series "Data Manual" Texas Instruments, 4 Pages, Retrieved from the Internet: URL: http://bitsavers.org/components/ti/_dataBooks/1989_TI_TGC100_Series_1-um_CMOS_Gate_Arrays_Data_Manual.pdf accessed online Jun. 4, 2019.

* cited by examiner

ALGORITHM ENGINE FOR ULTRA LOW-POWER PROCESSING OF SENSOR DATA

FIELD

The subject matter disclosed herein relates generally to a System on a Chip comprising a hardware sensor fusion engine.

BACKGROUNDS

The System on a Chip (SoC) is increasingly common in mobile devices such as smartphones and tablets. A SoC is an integrated circuit comprising multiple components of a computing system. For example, a typical SoC may contain one or more processor cores, a Graphics Processing Unit (GPU), a memory controller, and memory. Some SoCs may also contain components such as radios and basebands for cellular communication, Wi-Fi, GPS, and Bluetooth, etc., as well as a Digital Signal Processor (DSP).

It is desirable to improve power efficiency of SoCs used in mobile devices in order to increase battery life. More particularly, improving power efficiency of SoCs for sensor-related tasks is important because many context-based applications demand the gathering, processing, and fusing (combining data from disparate sensors to derive information) of sensor data from multiple sensors on a continuous always-on basis. Performing these sensor-related tasks on an always-on basis with a general purpose processor core and/or a DSP is overly energy-inefficient.

SUMMARY

An embodiment disclosed herein may include a method for power-efficiently processing sensor data comprising: configuring a sensor fusion engine and a peripheral controller with a general purpose processor; placing the general purpose processor into a low-power sleep mode; reading data from a sensor and storing the data into a companion memory with the peripheral controller; processing the data in the companion memory with the sensor fusion engine; and awaking the general purpose processor from the low-power sleep mode.

Another embodiment disclosed herein may include a System on a Chip (SoC) comprising: a general purpose processor; a sensor fusion engine comprising one or more hardware macros for sensor data-related algorithms; a companion memory; and a peripheral controller.

A further embodiment disclosed herein may include a non-transitory computer-readable medium including code that, when executed by a processor, causes the processor to: configure a sensor fusion engine and a peripheral controller with a general purpose processor, place the general purpose processor into a low-power sleep mode, read data from a sensor and storing the data into a companion memory with the peripheral controller, process the data in the companion memory with the sensor fusion engine, and awake the general purpose processor from the low-power sleep mode.

An additional embodiment disclosed herein may include an apparatus for power-efficiently processing sensor data comprising: means for processing data; means for fusing sensor data including means for executing sensor data-related algorithms; means for storing data; and means for controlling peripheral components, wherein the means for processing data is configured to provide configuration of the means for fusing sensor data and means for controlling peripheral components, the means for processing data is configured to enter a low-power sleep mode, the means for controlling peripheral components is configured to read data from a sensor and store the data into the means for storing data, and the means for processing data is configured to awaken from the low-power sleep mode.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, wearable devices, or any data processing apparatus.

Figure 1:
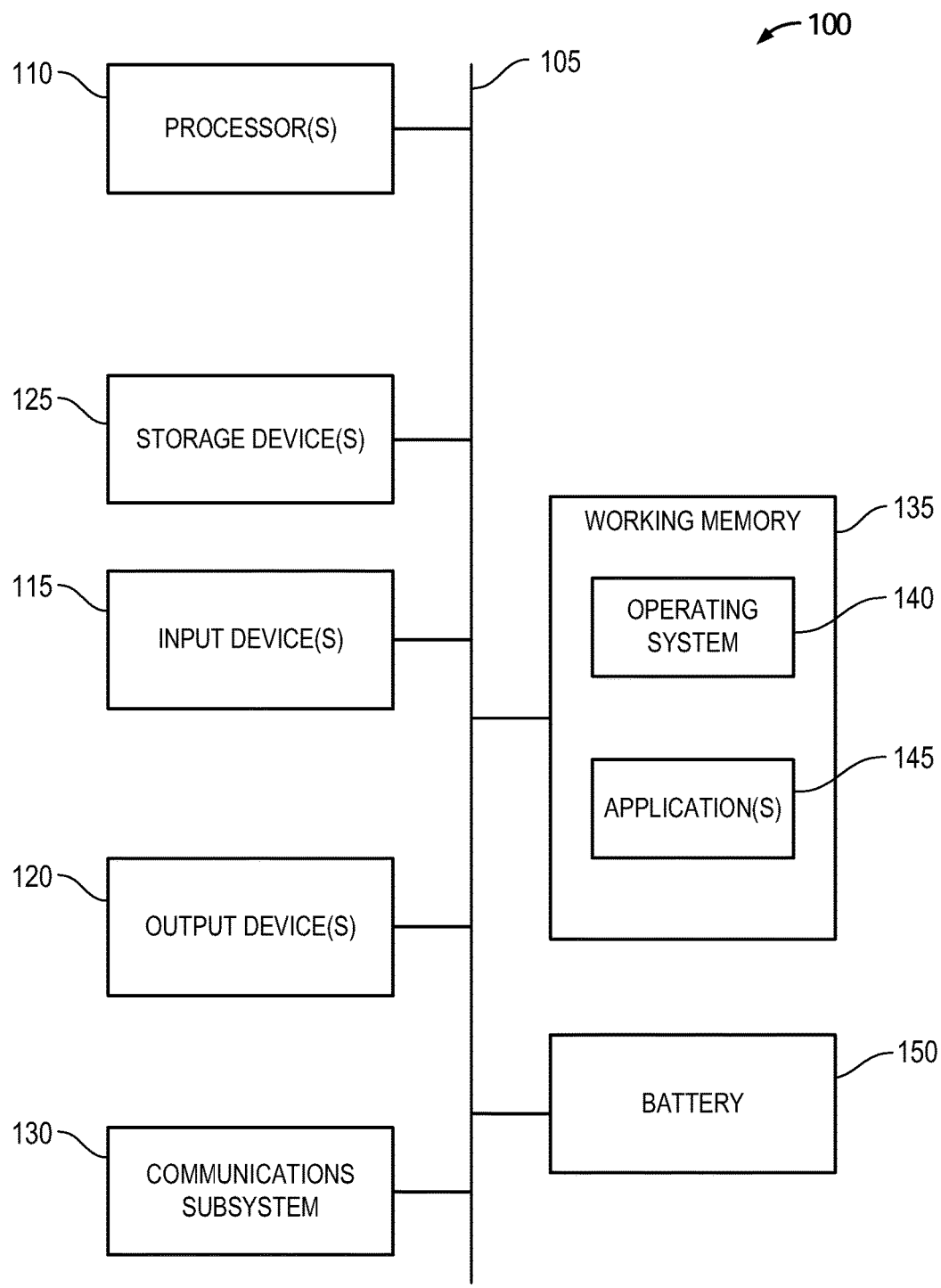
FIG. 1 illustrates an embodiment of a computing device where embodiments of the disclosure may be practiced.

An example computing device 100 adapted for context-based applications is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation one or more sensors, a mouse, a keyboard, keypad, touch-screen, microphone and/or the like; and one or more output devices 120, which can include without limitation a speaker, a printer, and/or the like.

The computing device 100 may further include (an/or be in communication with) one or more non-transitory storage devices 125, which can comprise, without limitation, local and/or network accessible storage, an/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication devices, etc.), and/or the like. The communications subsystem 130 may permit data to be exchanged with a network, other computing devices, and/or any other devices described herein. In one embodiment, the computing device 100 may further comprise a working memory 135, which can include a RAM or ROM device, as described above. Computing device may further comprise a battery 150. It should be appreciated that computing device 100 may be a mobile device or a non-mobile device, and may have wireless and/or wired connections.

The computing device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by computing device 100 (an/or a processor 110 within computing device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computing device, such as the system 100. In other embodiments, the storage medium might be separate from a computing device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

Application programs 145 may include one or more context-based applications which rely on sensor data or information derived from sensor data.

Figure 2:
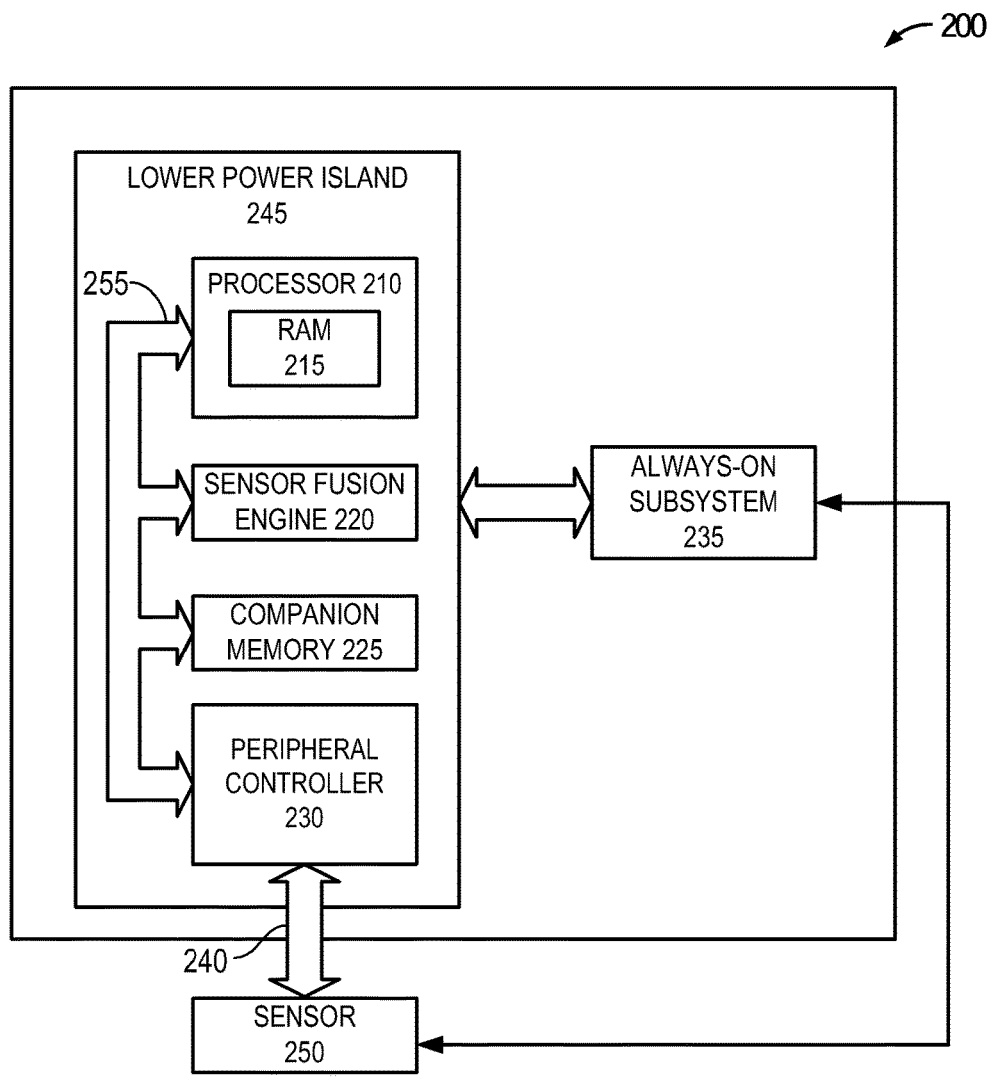
FIG. 2 illustrates a schematic diagram of an exemplary system on a chip.

FIG. 2 illustrates a schematic diagram of an exemplary SoC 200. SoC 200 may include a general purpose processor 210, a random access memory (RAM) 215, a sensor fusion engine 220, a companion memory 225, a peripheral controller 230, and an always-on subsystem (AOSS) 235. General purpose processor 210, sensor fusion engine 220, companion memory 225, and peripheral controller 230 may be communicatively connected via an internal interconnection 255. In one embodiment, companion memory 225 may be approximately several dozens of kilobytes in size. In another embodiment, companion memory 225 may be at least approximately 12 kilobytes in size. RAM 215 may have a dedicated connection with general purpose processor 210, or may be connected to other components via internal interconnection 255. In one embodiment, general purpose processor 210, RAM 215, sensor fusion engine 220, companion memory 225, and peripheral controller 230 may be located within a low power island 245 of SoC 200. The low power island is any section of the SoC designed for low power processing. The island may contain its own memory, clocks, PLLs, buses, dedicated voltage rails, power management circuits, memory, interfaces, digital or analog blocks, counters, microprocessors, and DSPs. In another embodiment, sensor fusion engine 220, peripheral controller 230, and companion memory 225 may be provided with a dedicated low power clock, so that data collection, buffering, and/or computation may take place when other parts of SoC 200 are in a low-power sleep mode with the system clock turned off and the main digital and memory rails for SoC 200 at retention voltage levels. In other words, in this embodiment, sensor fusion engine 220, peripheral controller 230, and companion memory 225 may have their own voltage rails (not shown) configured by the AOSS 235, or may be able to operate at retention voltage levels. In still another embodiment, peripheral controller 230 may be implemented with a dedicated programmable low-power processor, such as an ARM Cortex-M processor or a MIPS processor. SoC 200 may be in communication with one or more sensors 250 through peripheral controller 230 via a peripheral interface 240. Examples of one or more sensors 250 may include a proximity sensor, an ambient light sensor (ALS), an accelerometer, a gyroscope, a magnetometer, a barometric pressure sensor, and so on. These one or more sensors 250 may operate on an always-on basis. Sensors 250 may also be wireless connected via a connectivity chip using a protocol such as Bluetooth, Bluetooth LE, or 802.11. Peripheral interface 240 may be any of the suitable interfaces, such as I2C, SPI, UART, or SLIMbus, etc. AOSS 235 is always on and may perform multiple functions. For example, AOSS 235 may supply power to components of SoC 200 with one or more correct voltages, may receive data ready interrupt (DRI) signals from one or more sensors 250 when such interrupt signals are used, and may provide wake up signals to one or more components of SoC 200 such as peripheral controller 230. In some embodiments, sensor fusion engine 220, companion memory 225, and peripheral controller 230 may be part of AOSS 235. In other embodiments the sensor fusion engine 220, companion memory 225, and the peripheral controller 230 may be in other domains of the SoC. SoC 200 may include additional components, which are not shown in FIG. 2 in order not to obscure the disclosure.

Corresponding relationships may exist between elements shown in FIG. 2 and FIG. 1, and are described herein. General purpose processor 210 may be one of the one or more processors 110 shown in FIG. 1. RAM 215 may be part of the working memory 135 shown in FIG. 1. Internal interconnection 255, peripheral controller 230, peripheral interface 240, and AOSS 235 may be part of the bus 105 shown in FIG. 1. And one or more sensors 250 may be part of the one or more input devices 115.

SOC 200 may comprise a general purpose processor 210, a sensor fusion engine 220 comprising one or more hardware macros for sensor data-related algorithm, a companion memory 225, and a peripheral controller 230, where the general purpose processor 210 may configure the sensor fusion engine 220 and the peripheral controller 230 before it enters a low-power sleep mode. Thereafter, the peripheral controller 230 may read data from a sensor 250 and may store the data into the companion memory 225 and last the general purpose processor 210 may be awoken from the low-power sleep mode.

Sensor fusion engine 220 may have implemented therein one or more hardware macros. Hardware macros may perform sensor-related tasks with dedicated hardware circuitry and consume less energy than a general purpose processor and/or a DSP performing the same tasks does. A number of algorithms for sensor-related tasks may be implemented as hardware macros within sensor fusion engine 220. Examples include Kalman filters, motion detection algorithms, pedometer algorithms, navigation algorithms, gesture-related algorithms, sensor calibration algorithms, medical signal processing algorithms, fingerprint and/or touch algorithms, sensor data fusion algorithms, etc. The list is illustrative and does not limit the disclosure. Alternatively sensor fusion engine 220 may be an ultra-low power processor.

Different methods for utilizing sensor fusion engine 220 to perform sensor-related tasks in a power-efficient manner will be hereinafter described. For example, sensor fusion engine 220 may be left active together with companion memory 225 and peripheral controller 230 to collect and process sensor data taking advantage of the hardware macros while general purpose processor 210 and other components power-collapse into a sleep mode. General purpose processor 210 is awoken only when the sensor data processing is completed and general purpose processor 210 is required to perform other tasks. In an alternative embodiment, sensor fusion engine 220 acts as a math coprocessor to general purpose processor 210 to offload the tasks of executing computationally intensive sensor-related algorithms from general purpose processor 210. When a sensor fusion engine 220 is provided to act as a math coprocessor, a less powerful and likely more power-efficient general purpose processor 210 may be used.

Figure 3:
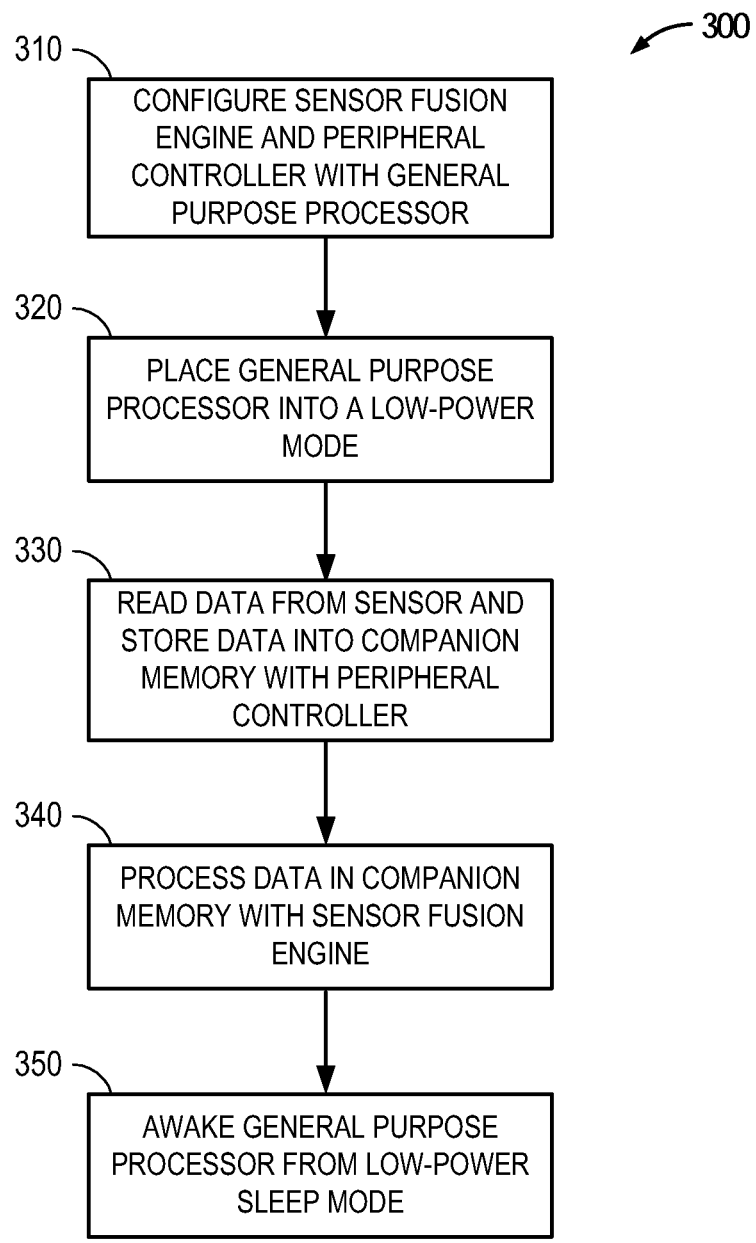
FIG. 3 is a flowchart illustrating an exemplary method for collecting and processing sensor data power-efficiently with a sensor fusion engine.

FIG. 3 is a flowchart illustrating an exemplary method 300 for collecting and processing sensor data power-efficiently with sensor fusion engine 220. At block 310, general purpose processor 210 configures sensor fusion engine 220 and peripheral controller 230. The particular configuration depends on the application(s) requesting sensor data and derived information. Sensor fusion engine 220 may be configured to execute one or more algorithms with the embedded hardware macros, while peripheral controller 230 is configured to read sensor data from at least one of the one or more sensors 250. At block 320, general purpose processor 210 enters a low-power sleep mode to conserve power. In some embodiments, other components such as peripheral controller 230 may also enter a sleep mode until being awoken to perform specific tasks.

At block 330, peripheral controller 230 reads sensor data from one or more sensors 250 and stores the read sensor data into companion memory 225. Different methods for reading sensor data from one or more sensors 250 may be utilized. For example, in a polling mode, peripheral controller 230 may be configured at block 310 to periodically query one or more sensors 250. In some embodiments, sensor data is transferred in an interrupt mode: when at least one of the one or more sensor 250 have data ready to be read, it transmits a DRI signal to AOSS 235. In response, AOSS 235 then sets appropriate voltage levels and awakes peripheral controller 230. Peripheral controller 230 then configures peripheral interface 240, reads sensor data, and stores the sensor data into companion memory 225. In some other embodiments, peripheral controller 230, instead of AOSS 235, may handle the interrupts so that voltage levels do not have to change.

At block 340, sensor fusion engine 220 processes sensor data stored in companion memory 225 with hardware macros. Processed sensor data and/or information derived from sensor data may also be stored in companion memory 225 by sensor fusion engine 220. In some embodiments, block 330 and block 340 may overlap in time, and may be repeated when necessary. Last, at block 350, sensor fusion engine 220 awakes general purpose processor 210 when all the sensor data processing is completed and general purpose processor 210 is required for further tasks.

Methods described herein allows for more power-efficient processing of sensor data. A computing device 100 that features a SoC 200 comprising sensor fusion engine 220, as described herein, may have a better battery life while supporting various context-based applications.

It should be appreciated that aspects of the disclosure previously described may be implemented in conjunction with the execution of instructions (e.g., applications) by processor 101 of computing device 100, as previously described. Particularly, circuitry of the device, including but not limited to processor, may operate under the control of an application, program, routine, or the execution of instructions to execute methods or processes in accordance with embodiments of the disclosure (e.g., the processes of FIG. 3). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

The teachings herein may be incorporated into (e.g., implemented within or performed by) a variety of apparatuses (e.g., devices). For example, one or more aspects taught herein may be incorporated into a general computing device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the claimed subject matter. Various modifications to these embodiments will be readily apparent to those skilled in the art, and the generic principles defined herein may be applied to other embodiments without departing from the spirit or scope of the disclosure. Thus, the claimed subject matter is not intended to be limited to the embodiments shown herein but is to be accorded the widest scope consistent with the principles and novel features disclosed herein.

What is claimed is:

1. A method for power-efficiently processing sensor data comprising:

configuring, by a general purpose processor, a sensor fusion engine that comprises a plurality of sensor data-processing algorithms implemented as hardware macros, each of the hardware macros comprising dedicated hardware circuitry for performing the corresponding sensor data-processing algorithm, wherein the plurality of sensor data-processing algorithms includes an algorithm, implemented as a hardware macro, for fusing of sensor data from multiple sensors;

upon the configuring, placing the general purpose processor into a low-power sleep mode;

in response to an interrupt from at least one of a plurality of sensors, waking a peripheral controller from a sleep mode;

after the waking, and with the peripheral controller, reading data produced by each of the plurality of sensors and storing the data into a companion memory while the general purpose processor is in the low-power sleep mode; and processing the data stored into the companion memory with the sensor fusion engine, wherein the configuring comprises configuring the sensor fusion engine to use the algorithm for fusing of sensor data from multiple sensors, implemented as a hardware macro, to perform the processing.

2. The method of claim 1, wherein the waking of the peripheral controller is performed by an Always-On Subsystem (AOSS), and
wherein the AOSS is configured to configure a voltage rail of at least one among the general purpose processor, the sensor fusion engine, the companion memory, and the peripheral controller.

3. The method of claim 1, wherein the sensor fusion engine, the companion memory, and the peripheral controller are located within a low power island of a System on a Chip (SoC) and
wherein a system clock of the SoC is turned off during the reading and processing.

4. The method of claim 1, wherein the sensor fusion engine is part of an Always-On Subsystem (AOSS) and
wherein the AOSS is configured to configure a voltage rail of at least one among the general purpose processor, the sensor fusion engine, the companion memory, and the peripheral controller.

5. The method of claim 1, wherein the algorithm for fusing combines data from disparate sensors to derive information.

6. A System on a Chip (SoC) comprising:
a companion memory;
a peripheral controller configured to read, from each of a plurality of sensors, data produced by the sensor and to store the data into the companion memory;
a subsystem configured to awaken the peripheral controller from a sleep mode in response to an interrupt from at least one of the plurality of sensors;
a sensor fusion engine configured to process the data stored into the companion memory; and
a general purpose processor configured to configure the sensor fusion engine before entering a low-power sleep mode,
wherein the sensor fusion engine comprises a plurality of sensor data-processing algorithms implemented as hardware macros, each of the hardware macros comprising dedicated hardware circuitry for performing the corresponding sensor data-processing algorithm, the plurality of sensor data-processing algorithms including an algorithm, implemented as a hardware macro, for fusing of sensor data from multiple sensors, and
wherein the sensor fusion engine is configurable by the general purpose processor to use the algorithm for fusing of sensor data from multiple sensors, implemented as a hardware macro, to process the data stored into the companion memory.

7. The System on a Chip (SoC) of claim 6, wherein the sensor fusion engine is configured to act as a math coprocessor to the general purpose processor.

8. The System on a Chip (SoC) of claim 6, wherein the waking of the peripheral controller is performed by an Always-On Subsystem (AOSS) and
wherein the AOSS is configured to configure a voltage rail of at least one among the general purpose processor, the sensor fusion engine, the companion memory, and the peripheral controller.

9. The System on a Chip (SoC) of claim 6, wherein the sensor fusion engine, the companion memory, and the peripheral controller are located within a low power island of the System on a Chip (SoC) that has a dedicated low power clock configured to be active when a system clock of the SoC is turned off.

10. The System on a Chip (SoC) of claim 6, wherein the sensor fusion engine is part of an Always-On Subsystem (AOSS), and
wherein the AOSS is configured to configure a voltage rail of at least one among the general purpose processor, the sensor fusion engine, the companion memory, and the peripheral controller.

11. The System on a Chip (SoC) of claim 6, wherein a particular configuration of the sensor fusion engine depends on an application of the general purpose processor requesting information derived from sensor data, and
wherein a particular configuration of the peripheral controller depends on the application requesting information derived from sensor data.

12. The System on a Chip (SoC) of claim 6, wherein the SoC further comprises a working memory that is separate from the companion memory and is configured to store instructions to be executed by the general purpose processor, and
wherein a storage capacity of the companion memory does not exceed several dozens of kilobytes.

13. The System on a Chip (SoC) of claim 6, wherein the algorithm for fusing combines data from disparate sensors to derive information.

14. A non-transitory computer-readable medium including:
code that, when executed by a peripheral controller, causes the peripheral controller to read, from each of a plurality of sensors, data produced by the sensor and to store the data into a companion memory;
code that, when executed by a subsystem, causes the subsystem to awaken the peripheral controller from a sleep mode in response to an interrupt from at least one of the plurality of sensors; and
code that, when executed by a general purpose processor, causes the general purpose processor to:
enter a low-power sleep mode; and
before entering the low-power sleep mode, configure a sensor fusion engine to process the data stored into the companion memory,
wherein the sensor fusion engine comprises a plurality of sensor data-processing algorithms implemented as hardware macros, each of the hardware macros comprising dedicated hardware circuitry for performing the corresponding sensor data-processing algorithm, the plurality of sensor data-processing algorithms including an algorithm, implemented as a hardware macro, for fusing of sensor data from multiple sensors, and
wherein the code that, when executed by the general purpose processor, causes the general purpose processor to configure the sensor fusion engine includes code that causes the general purpose processor to configure the sensor fusion engine to use the algorithm for fusing of sensor data from multiple sensors, implemented as a hardware macro, to process the data stored into the companion memory.

15. The non-transitory computer-readable medium of claim 14, wherein the subsystem is an Always-On Subsystem (AOSS) and
wherein the AOSS is configured to configure a voltage rail of at least one among the general purpose processor, the sensor fusion engine, the companion memory, and the peripheral controller.

16. An apparatus for power-efficiently processing sensor data comprising:

means for storing data;

means for controlling peripheral components, including means for reading, from each of a plurality of sensors, data produced by the sensor and storing the data read from each of the plurality of sensors into the means for storing;

means for waking, from a sleep mode, the means for controlling peripheral components in response to an interrupt from at least one of the plurality of sensors;

means for processing the data stored into the means for storing;

means for configuring the means for processing the data stored into the means for storing; and means for placing the means for configuring into a low-power sleep mode upon the configuring, wherein the means for processing the data stored into the means for storing comprises a plurality of sensor data-processing algorithms implemented as hardware macros, each of the hardware macros comprising dedicated hardware circuitry for performing the corresponding sensor data-processing algorithm, the plurality of sensor data-processing algorithms including an algorithm, implemented as a hardware macro, for fusing of sensor data from multiple sensors, and wherein the means for processing the data stored into the means for storing is configurable by the means for configuring to use the algorithm for fusing of sensor data from multiple sensors, implemented as a hardware macro, to process the data stored into the means for storing.

17. The apparatus of claim 16, wherein the means for processing, the means for storing data, and the means for controlling peripheral components are located within a low power island of a System on a Chip (SoC) that has a dedicated low power clock configured to be active when a system clock of the SoC is turned off.

18. The apparatus of claim 16, wherein the means for waking is an Always-On Subsystem (AOSS) and wherein the AOSS is configured to configure a voltage rail of at least one among the general purpose processor, the sensor fusion engine, the companion memory, and the peripheral controller.

19. The apparatus of claim 16, wherein the means for processing is part of an Always-On Subsystem (AOSS) and wherein the AOSS is configured to configure a voltage rail of at least one among the general purpose processor, the sensor fusion engine, the companion memory, and the peripheral controller.

20. The apparatus of claim 16, wherein the algorithm for fusing combines data from disparate sensors to derive information.

* * * * *